2,749,426

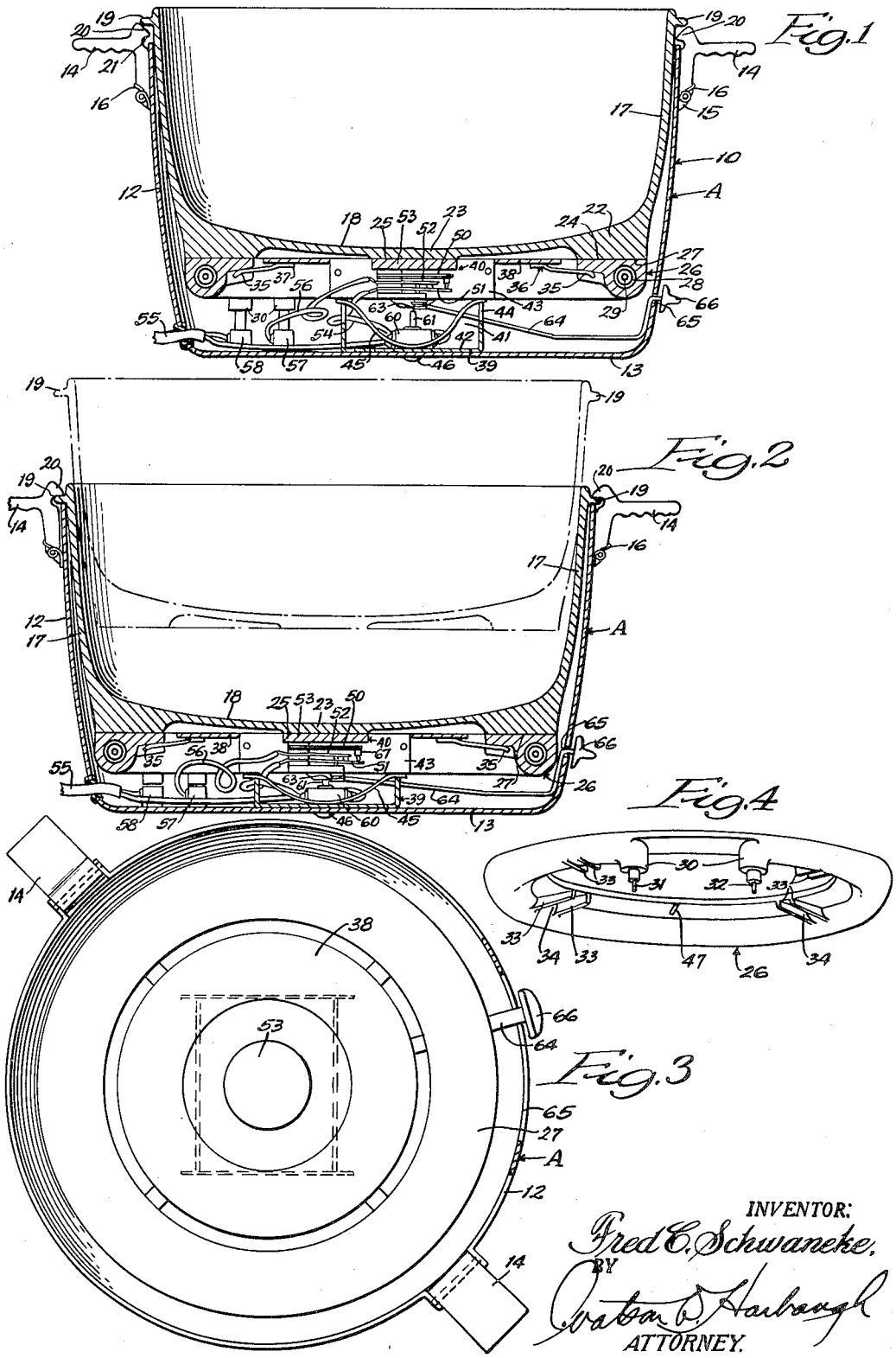

COOKING VESSEL

Fred C. Schwaneke, Chicago, Ill., assignor to Dormeyer Corporation, Chicago, Ill., a corporation of Illinois Application December 14, 1953, Serial No. 397,918

6 Claims. (Cl. 219—43)

This invention relates to a cooking vessel and more particularly, to an electric cooking vessel having a removable pot.

Considerable difficulty has been experienced heretofore in providing electrically-heated cooking vessels having removable pots. The reason for this is that in vessels of this character the establishment of good heat-exchange relation between the removable pot and the electrical heating element automatically, whenever the pot is placed within the housing or shell of the vessel, has been virtually impossible. Where a good heat-exchange relation between the pot and heating element is not provided, there is poor heating of the pot, ineffective thermostatic control where a thermostat is provided and, generally, ineffective cooking and utilization of the heat developed in the heating element.

It is accordingly an object of the invention to provide a cooking vessel having a removable pot and wherein good heat-exchange relation between the pot and the heating element is automatically provided whenever the pot is replaced within the vessel housing or shell. Another object of the invention is to provide a pot having a flat and relatively wide heating surface that is engageable with a complementary flat and relatively wide surface provided by a heating element; the arrangement being such that the heating surface of the pot is automatically placed in planar contact with the flat surface of the heating element whenever the removable pot is replaced within the housing of the vessel. Still another object is in providing a heating element that is spring-biased toward the open upper end of the vessel housing and which serves the dual function of ejecting the pot at least partially to facilitate removal thereof from the housing and also automatically seats the heating element in good thermal contact with the pot when the pot is replaced within the housing. Yet another object is to provide an electrically-heated cooking vessel equipped with a thermostat and wherein the heating element and thermostat are afforded limited longitudinal movement within the shell of the vessel and relative thereto while being spring-loaded to automatically seat the heating element in heat-exchange relation with the pot when the same is replaced within the vessel housing and, at the same time, breaks the electric circuit for the heating element when the pot is removed from the vessel. A further object is to provide a cooking vessel with a removable pot and to orient handles upon the shell or housing of the vessel so that a pot portion is cammed over the handles when the pot is replaced within the housing while the handles are operative to normally confine the pot within the housing. Yet a further object is to provide a thermostatic control for an electrically-heated cooking vessel that is responsive to the average temperature within the pot whereby relatively accurate control of the cooking temperature is afforded. Still a further object is to provide a thermostat wherein a geometric parallelism of the heat-responsive element and at least one of the electric contact members is provided, with the result that very accurate thermostatic response is achieved. Additional objects and advantages will appear as the specification proceeds.

An embodiment of the invention is illustrated in the accompanying drawings, in which—

Fig. 1 is a vertical sectional view of a cooking vessel embodying my invention and wherein the removable pot is being moved into position within the housing of the vessel; Fig. 2 is a vertical sectional view similar to that of Fig. 1 and showing the removable pot in position within the vessel housing and wherein the position of the pot when partially removed from the housing is illustrated in broken lines; Fig. 3 is a top plan view of the cooking vessel with the pot thereof removed; and Fig. 4 is a perspective view of the heating element.

Shown in Figs. 1 and 2 is a cooking vessel indicated generally with the letter A and which comprises a shell or housing 10 and a removable pot 11. The shell 10 has upwardly- and outwardly-extending side walls 12, a bottom wall 13, and is open at its top. Adjacent the open top of the housing 10 a pair of handles 14 are provided, one on each side of the vessel, and the handles are pivotally mounted between ears 15 with which the side walls 12 of the shell are equipped, and are biased in the upward position illustrated by springs 16. While the shell or housing 10 of the vessel is preferably made of metal of any suitable type, such as stainless steel for example, or enamelled steel or aluminum, the handles 14 are preferably formed of a material that does not readily conduct heat and, for example, may be any of the plastics customarily used for this purpose, such as Bakelite.

The removable pot 11 is preferably formed of cast aluminum so that it readily conducts heat. The pot has upwardly- and outwardly-inclined side walls 17 and a bottom wall 18. The pot 11 is adapted to be removably received through the open top of the shell 10 and the dimensions thereof are slightly less than those of the shell. Adjacent the open top of the pot 11 the walls 17 thereof are equipped with a laterally-extending flange 19 that is adapted to slide freely over the cam surface 20 of the handles 14 when the pot is being inserted into the shell, and which is also adapted to be received under the hook portion 21 of the handles when the pot is completely within the shell, whereby the handles confine the pot within the shell.

The bottom wall 18 of the pot 11 is enlarged at 22 adjacent the outer edge thereof and is also slightly enlarged at the center, as is indicated by the numeral 23. The enlarged portion 22 is substantially annular, as is the enlarged portion 23, so that the pot 11 may be inserted in any convenient position into the shell 10. Preferably, the enlarged area 22 provides a flat and relatively wide heat-exchange surface 24 that may be formed by finishing the surface with a machine cut. Similarly, the surface 25 provided by the enlarged central portion 23 is also flat and is preferably smooth and finished, such as may be provided by machining of this surface.

Mounted within the bottom portion of the shell 10 is a heating element that is designated generally with the numeral 26. The heating element 26 is annular, as is indicated best in Fig. 4, and provides at the upper side thereof a flat and relatively wide surface 27 that is complementary to and is adapted to be placed in planar relation with the heating surface 24 of the pot 11. The critical feature here is that the surfaces 24 and 27 provided respectively by the pot 11 and heating element 26 be in contact throughout their entire areas so that a condition of good heat-exchange relation therebetween is provided. Preferably, the element 26 is formed from a material having good heat-conducting properties and, for example, aluminum is a suitable material having such properties. The element 26 is provided with a passage 28 therethrough in which is mounted a heating coil 29 that may be wholly conventional and, since well known in the art, will not be further described. The bottom surface of the heating element 26 is provided with two spaced-apart bosses 30 which provide a mounting for a terminal 31 and also a terminal 32 which are in electric contact with the heating coil 29.

Also along the bottom surface of the element 26 and preferably equally spaced thereabout, are depending guides 33 which provide therebetween a channel 34, and each channel slidably receives therein the end portion 35 of a spring member 36. The spring members 36 are rigidly secured at their inner ends 37 to the wall 38 of the hub member 39. As is seen best in Fig. 4, four depending channels 33 are provided and each is adapted to receive the outer end of a spring member 36, there being four in number. The spring members 36 are adapted to spring-load or bias the element 26 in an upward direction toward the open top of the shell 10.

As can be seen best in Figs. 1 and 2, a thermostat, indicated generally by the numeral 40, is mounted for vertical movement within the annular space 41 provided by the depending central portion 42 of the hub member 39.

End portions 43 of the thermostat are slidably received within slots 44 provided in the central portion 42, and an arcuate spring 45 biases the thermostat 40 upwardly whereby it is forced into good heat-exchange relation with the enlarged central portion 23 of the pot 11.

The wall 38 of the hub member also serves as a shield enclosing the wiring, etc. Preferably the hub member 39 is secured to the bottom wall 13 of the housing by a screw 46.

The thermostat 40 includes a heat-responsive member 50 that is preferably a bimetallic element and responds to the application of heat thereto to deflect in a downward direction and into engagement with a contact member 51 to push the same away from the contact member 52 and out of electrical engagement therewith. The members 50, 51 and 52 are spaced apart by suitable insulating members and are mounted upon a bracket 53 which provides a finished upper surface adapted to engage throughout the entire width thereof the surface 25 provided by the enlarged central portion 23 of the pot.

The heating circuit for the element 26 includes the thermostat 40 and is seen to also include the lead 54 which is connected to the terminal of the contact member 51 of the thermostat and extends therefrom outwardly and to a cable 55 which is adapted to be plugged into a suitable electric outlet. The second lead 56 is connected through a terminal to the contact member 52 of the thermostat and extends therefrom to a plug 57 which receives the terminal 31 of the heating element, through the heating element, and to the terminal 32 thereof and from there into the terminal 58 and from there to the cable 55. It will be appreciated that the terminals 31 and 32 of the heating element are received within the female terminals 57 and 58 provided within the shell 10 when the heating element is in position within the shell.

It is desired to positively interrupt the heating circuit when the pot 11 is removed from the shell 10 of the cooking vessel. This is accomplished by interposing a switch 60 in the lead 54 and by orienting the switch under the thermostat so that when the thermostat is pressed downwardly by positioning of the pot 11 within the shell, the plunger 61 of the switch is depressed to close the circuit. On the other hand, when the pot is removed the thermostat moves upwardly and the switch 60 breaks the heating circuit.

Preferably, the thermostat is provided with a selection device 63 which permits the user of the cooking vessel to set the cooking temperature thereof by selecting the desired temperature from a range of permissible temperatures that are indicated by appropriate indicia upon the outer surface of the shell 10. The adjusting means 63 is equipped with an outwardly-extending arm 64 that eventually extends through an elongated slot 65 in the side wall of the shell 10 and which is equipped with a knob 66 which may have a suitable witness mark thereon to enable the knob to be moved readily and into alignment with the selected temperature from the temperature indicia carried by the shell.

Preferably, the thermostat 40 is adjustable so that the heat-responsive element 50 and the contact member 51 controlled thereby can be brought into a condition of geometric parallelism whereby the accuracy of response of the thermostat is considerably improved. I have discovered that where a condition of parallelism exists between the heat-responsive member and the contact member controlled thereby, that it is possible to select the cooking temperature to within about 5° of accuracy throughout a relatively wide range of cooking temperatures such as, for example, one having a lower limit of 220° F. and an upper limit of 550° F. To establish such parallelism I provide an adjusting means 67 which determines the spacing between the element 50 and member 51.

*Operation*

To start a sequence of operations, assume that the removable pot 11 is within the shell 10, as is indicated in full lines in Fig. 2. The cable 55 will then be connected to a suitable electric outlet and upon adjustment of the knob 66, current will flow through the heating coil 29 and the heat developed within the element 26 will be quickly conducted to the pot 11 through contact of the surfaces 24 and 27, with the result that the contents of the pot will be cooked. If it is desired to raise or lower the cooking temperature, the knob 66 is simply moved to a new position which will vary the respective positions of the contact members 51 and 52 in a manner well known in the art, and the thermostatic response will thereby be changed.

As has been indicated, the thermostat 40 is in good heat-exchange relation with the pot 11 and is oriented at substantially the center thereof so that it is spaced a considerable distance from the heating coil 29. Therefore, the movement of the heated contents of the pot 11 will be from the outside thereof toward the center and the thermostat will be responsive to the substantially average temperature within the pot 11 rather than to the maximum temperature thereof and a more accurate and desirable thermostatic response is thus provided.

When it is desired to remove the pot 11, the spring-biased handles 14 are swung outwardly and the biasing force of the spring members 36 urges the heating element 26 upwardly and thereby the pot 11 is pushed upwardly so that the upper annular ledge 19 thereof is pushed above the handles 14. It is noted that the upward force against the thermostat 40 provided by the spring arms 45 also aids in pushing the pot 11 upwardly. When the pot is in its uppermost position it may readily be grasped and lifted out of the shell 10.

The spring arms, in pushing the element 26 upwardly and also the thermostat 40 upwardly, cause the switch 60 to break contact which positively opens the heating circuit and no further heating of the element 26 can take place.

When out of the shell 10, the pot 11 may be cleaned or otherwise handled as, for example, by placing it in an oven for further heating, etc., and when it is desired to replace the pot 11 it is simply inserted into the shell 10 and moved downwardly therein. The upper edges 20 of the handles 14 provide cam surfaces over which the laterally-extending ledge 19 of the pot slides in the downward movement thereof, forcing the handles 14 outwardly to permit the pot to be seated within the shell. The springs 16 force the handles over the ledge 19 so that the handles then constrain the pot within the shell.

The pot 11 can be inserted into the shell irrespective of its position and in moving downwardly into the shell an automatic seating of the heating element 26 upon the pot 11 takes place. The spring ends 35 slide freely within the recesses 34 provided along the bottom surface of the element while the spring members urge the element upwardly and into tight engagement with the finished surface 24 provided along the sides of the pot 11. A planar contact between the element and pot is thus provided automatically and a good solid engagement of the surfaces 24 and 27 throughout the entire areas thereof is automatically achieved with the result that excellent heat-exchange from the element to the pot is afforded and efficient utilization of the heat developed in the element 26 and efficient cooking of the contents of the pot 11 results.

While in the foregoing specification an embodiment of the invention has been set out in considerable detail for purposes of illustration, it will be apparent to those skilled in the art that considerable deviation from these details may be made without departing from the spirit and principles of the invention.

I claim:

1. In a cooking vessel, a shell equipped at its upper end with a pair of spaced-apart handles and having an open top, a pot removably receivable through the open top of said shell, said pot being equipped adjacent the upper end thereof with a laterally-extending flange adapted to slide over said handles during the movement of the pot into said shell, said handles being equipped with hook portions adapted to engage said flange when said pot is within said shell and being yieldably urged into hook relation therewith, said pot being provided at the lower end thereof with an annular heat-exchange surface, a heating element mounted within said shell for limited longitudinal movement relative thereto and being provided with a heat-exchange surface adapted to engage in heat-exchange relation therewith the surface of said pot, spring means carried by said shell and in engagement with said heating element and normally biasing the same upwardly and into engagement with said pot, an adjustable thermostat mounted within said shell for limited longitudinal movement relative thereto, spring means biasing said thermostat upwardly and into engagement with said pot when received within said shell, a switch mounted below said thermostat and within said shell and being adapted to be actuated by said thermostat when the same is pushed downwardly upon the movement of said pot into said shell, and circuit means for said heating element and including said switch and thermostat in series.

2. In a self-contained portable cooking vessel, a shell having an open top, a heating and support element mounted within said shell for limited longitudinal movement relative thereto, said heating element having a flat annular surface facing the open top of the shell, means for urging said element toward the open top of said shell, a pot receivable in said shell through the open top thereof and movable downwardly therethrough into abutting relationship with the upper surface of said heating and support element and into heat-exchange engagement with said element, said pot having an integrally formed flat annular ring dimensioned to correspond to the configuration of said heating element whereby efficient and effective heat exchange between said pot and said element is assured when in abutting relationship, means for releasably confining said pot within said shell, a switch mounted in said shell, and a thermostat disposed in resilient engagement with said pot and arranged in series circuit with said switch, whereby the circuit is opened when the pot is removed from said shell or when the temperature of said pot reaches a predetermined level.

3. An electrical cooking vessel comprising a shell having an open top, a heating element movably arranged within said shell, spring means for normally urging said heating element upwardly towards said open top, a pot receivable in said shell, releasable means for retaining said pot in a position within said shell in which said spring means is operative to afford a firm engagement between said pot and said heating element, a switch within said shell operative to close a series circuit when said pot is so positioned and to open said circuit when said retaining means is released, and a thermostat resiliently urged into engagement with said pot and operative upon actuation to open said circuit when the temperature within said pot reaches a predetermined level and to close said circuit when the temperature within said pot drops below a predetermined level.

4. An electrical cooking vessel comprising a shell having an open top, a heating element movably arranged within said shell, spring means for normally urging said heating element upwardly towards said open top, a pot receivable in said shell, releasable means for retaining said pot in a position within said shell in which said spring means is operative to afford a firm engagement between said pot and said heating element, said means comprising a flange extending outwardly of the top edge of said pot and a plurality of circumferentially spaced handles pivotally mounted on said shell and adapted to engage said flange, a switch operative to close a series circuit when said pot is so positioned and to open said circuit when said retaining means is released, and a thermostat resiliently urged into engagement with said pot and operative upon actuation to open said circuit when the temperature within said pot reaches a predetermined level and to close said circuit when the temperature within said pot drops below a predetermined level.

5. An electrical cooking vessel comprising a shell having an open top, a heating element movably arranged within said shell, spring means for normally urging said heating element upwardly towards said open top, a pot receivable in said shell, releasable means for retaining said pot in a position within said shell in which said spring means is operative to afford a firm engagement between said pot and said heating element, said means comprising a flange extending outwardly of the top edge of said pot and a plurality of circumferentially spaced handles pivotally mounted on said shell and adapted to engage said flange, said handles being provided with hook portions having cam surfaces for movement thereof outwardly when said pot is inserted in said shell, a switch operative to close a series circuit when said pot is so positioned and to open said circuit when said retaining means is released, and a thermostat resiliently urged into engagement with said pot and operative upon actuation to open said circuit when the temperature within said pot reaches a predetermined level and to close said circuit when the temperature within said pot drops below a predetermined level.

6. An electrical cooking vessel comprising a shell having an open top, a heating element movably arranged within said shell, said heating element having a flat annular surface facing said open top, spring means for normally urging said heating element upwardly towards said open top, a pot receivable in said shell, and having at the bottom thereof a flat annular surface, releasable means for retaining said pot in a position within said shell in which said spring means is operative to afford a firm engagement between the confronting annular surfaces of said pot and said heating element, a switch operative to close a series circuit when said pot is so positioned and to open said circuit when said retaining means is released, and a thermostat resiliently urged into engagement with said pot and operative upon actuation to open said circuit when the temperature within said pot reaches a predetermined level and to close said circuit when the temperature within said pot drops below a predetermined level.

(References on following page)

References Cited in the file of this patent

UNITED STATES PATENTS

| | | |
|---|---|---|
| 1,064,358 | Mettler | June 10, 1913 |
| 2,159,876 | Lacy | May 23, 1939 |
| 2,263,350 | Challet | Nov. 18, 1941 |
| 2,430,196 | Vaughn | Nov. 4, 1947 |
| 2,430,715 | Grayson | Nov. 11, 1947 |

FOREIGN PATENTS

| | | |
|---|---|---|
| 631,408 | Germany | June 19, 1936 |
| 853,911 | France | Dec. 23, 1939 |